US006341892B1

(12) United States Patent
Schmermund

(10) Patent No.: US 6,341,892 B1

(45) Date of Patent: Jan. 29, 2002

(54) RESISTANCE THERMOMETER PROBE

(76) Inventor: George Schmermund, 1660 Marbella Dr., Vista, CA (US) 92083

( * ) Notice: Subject to any disclaimer, the term of this patent is extended or adjusted under 35 U.S.C. 154(b) by 0 days.

(21) Appl. No.: 09/497,838

(22) Filed: Feb. 3, 2000

(51) Int. Cl.[7] ............................ H01C 1/01; H01C 1/02; H01C 1/024; G01K 1/08; G01K 7/18

(52) U.S. Cl. ........................ 374/185; 338/22 R; 338/25

(58) Field of Search ................................ 374/183, 185, 374/187, 208, 139, 193, 194, 195; 338/25, 22 R

(56) References Cited

U.S. PATENT DOCUMENTS 3,776,040 A * 12/1973 Gould, III ............... 73/362 AR
4,719,442 A 1/1988 Bohara ........................ 338/25
4,791,398 A 12/1988 Sittler et al. .................. 338/25
4,805,296 A 2/1989 Jinda et al. ................... 29/620
4,841,273 A * 6/1989 Horton ........................ 338/28
4,934,831 A * 6/1990 Volbrecht ................... 374/183
4,984,904 A * 1/1991 Nakano et al. ............. 374/139
5,046,857 A * 9/1991 Metzger et al. ............. 374/135
5,209,571 A * 5/1993 Kendall ...................... 374/139
5,340,019 A * 8/1994 Bohan, Jr. et al. ........ 236/20 R
5,372,427 A * 12/1994 Padovani et al. ........... 374/185
5,831,512 A 11/1998 Wienand et al. .............. 338/25
5,959,524 A 9/1999 Wienand et al. .............. 338/28

FOREIGN PATENT DOCUMENTS

GB 2203554 A * 5/1982 ................. 374/183
JP 0086714 * 5/1982 ................. 374/208

* cited by examiner

*Primary Examiner*—Diego Gutierrez
*Assistant Examiner*—Gail Verbitsky

(57) ABSTRACT

A resistance thermometer probe comprising a temperature sensor and a housing around the temperature sensor. The housing having a temperature sensing tip for placement of the temperature sensor and a stem to enable the temperature sensing tip to reach into otherwise inaccessable positions. The stem being generally cylindrical in shape and the temperature sensing tip being an integral extension of the stem but is reduced in both diameter and wall thickness to minimize thermal capacity and to maximize heat conduction. The probe also has electrically conductive wire leads to connect the temperature sensor to an ohmmeter. Fine granular glass particles and molecular sieve are placed in the empty space left after the temperature sensor and conductive wires have been inserted into the housing. The particles provide mechanical support to the temperature sensor, and reduces convection. The use of molecular sieve enables the temperature sensor to be cleared of contaminants and have a partial vacuum generated within the probe without having to use an external pump; this is accomplished by heating the probe (before it has been sealed) to a high temperature, then part of the probe is allowed to cooled to an intermediate temperature while the probe is sealed; When the molecular sieve is finally allowed to cool to room temperature, it becomes activated to absorb substantially all the gases, moisture and organic contaminants inside the probe leaving the temperature sensor in a partial vacuum.

11 Claims, 2 Drawing Sheets

26 27 30 29 21 20 24 18 16 15 28 13 31 32 22 23 25 19 17 14

RESISTANCE THERMOMETER PROBE

BACKGROUND OF THE INVENTION

When temperature needs to be measured to an accuracy of millidegrees Celcius or better, the use of Platinum resistance thermometers is preferred. Platinum resistance thermometers are used as primary standards to calibrate other types of thermometers. The electrical resistivity of Platinum has been extensively studied and documented in handbooks and other publications on thermometry.

For use in thermometers, It is desirable to have platinum resistance temperature sensors having resistance in the range of about ten ohms to several thousand ohms because resistances in this range are easier to measure than much higher or lower resistances. In the past, thin platinum wires have been used extensively as temperature sensors. Platinum wires that are thin enough to give easy-to-measure resistances turn out to be expensive to manufacture and fragile to handle. More recently, resistance temperature sensors have been made with thin films of platinum or ceramic substrates. The platinum film is often fabricated in a serpentine pattern to maximize resistance, and when supported by the substrate, is rugged enough for handling.

In most applications, the platinum resistance temperature sensor needs to be placed in a hermetically sealed housing for protection against contamination. The housing, with the enclosed temperature sensor and necessary connecting wires, then function as a resistance thermometer probe (hereinafter sometimes also referred to as "probe"). At the tip of the probe is the temperature sensor. In most applications, the probe also has an elongated stem so the temperature sensing tip can be inserted into otherwise inaccessable positions for making measurements.

There have been many prior inventions concerned with the fabrication of thin film resistor temperature sensing devices. Prefabricated thin film platinum resistor temperature sensing devices on ceramic substrates can be purchased at reasonable cost from suppliers such as Omega Engineering (some for less than $20). But ready-to-use probes, with a platinum resistor temperature sensor installed and sealed in a protective housing, may cost thousands of dollars.

It is therefore highly desirable to have low cost platinum resistor thermometer probes to be used with ohmmeters for measuring temperatures.

One embodiment of the invention provides a resistance thermometer probe comprising a temperature sensor and a housing around the temperature sensor. The housing having a temperature sensing tip for placement of the temperature sensor and a stem to enable the temperature sensing tip to reach into otherwise inaccessable positions. The stem being generally cylindrical in shape and the temperature sensing tip being an integral extension of the stem but is reduced in both diameter and wall thickness to minimize thermal capacity and to maximize heat conduction. The probe also has electrically conductive wire leads to connect the temperature sensor to an ohmmeter. Fine granular glass particles and molecular sieve are placed in the empty space left after the temperature sensor and conductive wires have been inserted into the housing. The particles provide mechanical support to the temperature sensor, and reduces convection. The use of molecular sieves enables the temperature sensor to be cleared of contaminants and have a partial vacuum generated within the probe without having to use an external pump. This is accomplished by heating the probe (before it has been sealed) to a high temperature, then part of the probe is allowed to cooled to an intermediate temperature while the probe is sealed; when the molecular sieve is finally allowed to cool to room temperature, it becomes activated to absorb substantially all the moisture and organic contaminants inside the probe leaving the temperature sensor in a partial vacuum.

BRIEF DESCRIPTI0N OF THE DRAWINGS

DETAILED DESCRIPTION OF THE INVENTION

Figure 1:
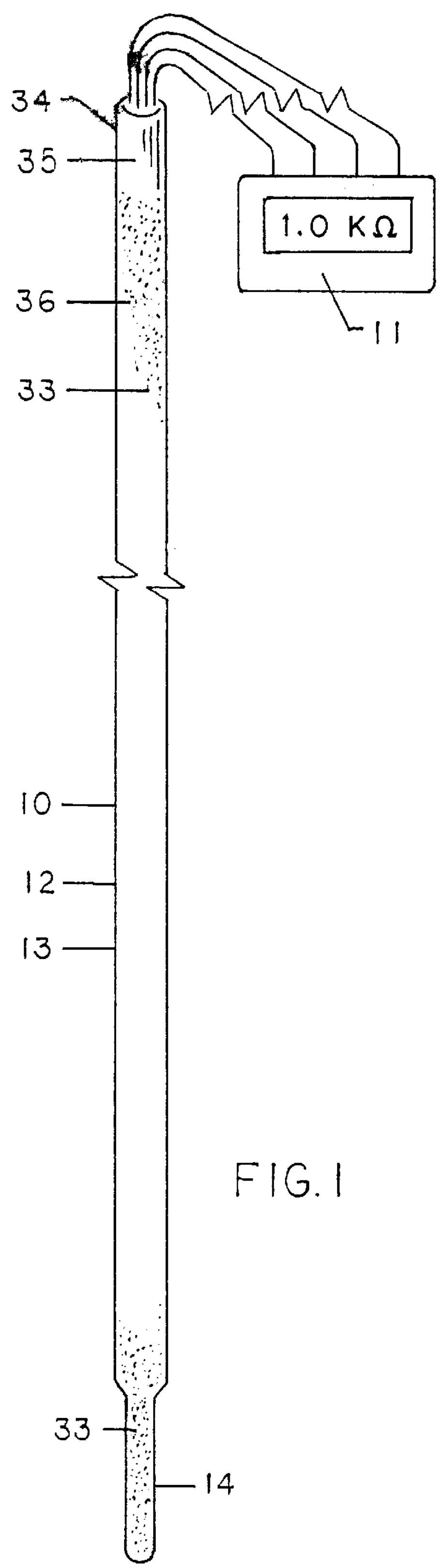
FIG. 1 shows a resistance thermometer, comprising an ohmeter and a probe which is a preferred embodiment of the invention

FIG. 1 shows a resistance thermometer 10 comprising an ohmmeter 11 and a resistance thermometer probe 12 (hereinafter sometimes also referred to as "thermometer probe" or "probe"). The probe 12 has a stem 13 and a temperature sensing tip 14. The stem 13 is substantially cylindrical in shape, and the temperature sensing tip 14 is an extension of the stem 13.

Figure 2:
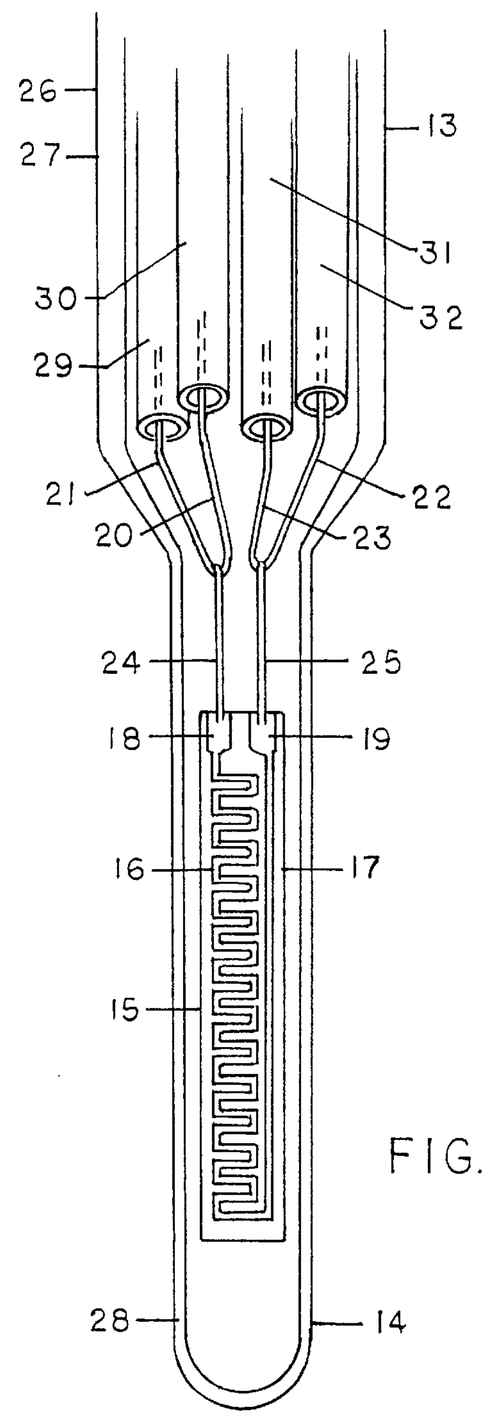
FIG. 2 shows an enlarged sectional view of the temperature sensing end of the probe of FIG. 1

FIG. 2 shows an enlarged sectional view of the tip 14 showing a resistance temperature sensor 15 (hereinafter sometimes also referred to as "temperature sensor" or "sensor"), which, in one preferred embodiment, comprises a thin film platinum resistor 16 on a ceramic substrate 17. The platinum resistor 16 is formed in a serpentine pattern to fit onto a small substrate area. At the ends of the resistor 16 are enlarged pads 18, 19 for making external connections.

The sensor 15 is connected electrically to the ohmmeter 11 by means of four conductive wire leads 20–23. Two of these wires 20 and 23 are used for carrying current and the other two 21 and 22 are for measuring the voltage. The use of four wires is well know in the art of making accurate measurements of resistances. For maximum accuracy, the resistance should be measured at zero current; however, one cannot measure resistance without current, therefore the resistance at zero current is found by extrapolation using more than one measurement at small currents. Short wires 24 and 25 connect the wires leads 20–23 to the pads 18 and 19 on the temperature sensor 15.

The probe has a housing 26. The housing 26 has a stem 27 and a temperature sensing tip 28. The stem 27 and tip 28 of the housing 26 should not be confused with the stem 13 and tip 14 of the probe 12. The stem 13 of the probe 12 comprises the stem 27 of the housing 26 and everything encloses within the stem 27 of the housing 26, similarly the tip 14 of the probe 13 comprises the tip 28 of the housing and everything enclosed within the tip 28 of the housing 26.

The tip 28 of the housing 26 is an extension of the stem 27. Compared to the stem 27, the tip 28 is reduced in both diameter and wall thickness to minimize thermal capacity of the tip 14 and to maximize heat conduction to the temperature sensor 15. Inside the stem 27, the wires 20–23 are insulated from each other by sleeves 29–32.

Shown in FIG. 1, but not in FIG. 2, are fine granular particles 33 filling the empty space in the housing 26 that is not occupied by the temperature sensor 15, the wires 20–25, or the sleeves 29–32. The particles 33 have coefficient of thermal expansion closely matching that of the housing material. One function of the fine granular particles 33 is to provide mechanical support to the temperature sensor 15, another function of the fine particles 33 is to reduce convection inside the probe 12.

For protection against contamination, the housing 26 is sealed at the end 34 opposite to the temperature sensing tip 28. In low-cost thermometers, the seal 35, is made with an adhesive such as hot-melt glue, epoxy resins, vacuum waxes or greases such as Apiezon. The seal 35 could also have been made with glass having coeficient of expansion matching that of the feedthrough wires.

Positioned near the seal end 34, and sealed with the rest of the components inside the housing 26, are granules of molecular sieve material 36. The purpose of the molecular sieve 36 is to capture contaminants (such as water), thus offering additional protection to the sensor 15.

Not shown in the figures, but probably desirable in most applications, are additional cables for connecting from wire leads 20–23 to ohmmeter 11 which might be placed some distance away.

In one preferred embodiment of the invention, the resistance temperature sensor is a premanufactured thin film platinum resistor on ceramic aluminum oxide substrate complete with ceramic overcoating for protection and preattached wires 24 and 25. Dimensions of the substrate is approximately 10 mm×2 mm×0.5 mm, and the resistor has been laser trimmed to a nominal resistance of 1,000 ohms at 0 degrees C. Similar thin film resistor temperature sensing devices are available from manufacturers and suppliers such as Omega Engineering, some for less than $20.

In one preferred embodiment of the invention, the housings 26 is made of borosilicate glass (a popular brand of which is commonly referred to as "Pyrex"). The stem is a length of pyrex tubing approximately 400 mm long, 8 mm diameter, and 1 mm wall thickness. A 20 mm long section at one end of the tubing is reduced to 4 mm in diameter and 0.5 mm in wall thickness, and the end is sealed off. This reduced section becomes the tip 28 of the housing. The use of a pyrex housing limits the probe's usable temperature range to below 450 degrees C. The sleeves 29–32 and particles 33 are all pyrex to match the coeficient of expansion of the housing 26. The particles 33 are approximately 0.1 mm in size (125 mesh).

In one preferred embodiment of the invention, an epoxy resin is used as the seal 35 for sealing the probe housing 26. Epoxies are generally not considered the best choice in high temperature applications, but it is inexpensive and convenient to use. The use of epoxy and other lower temperature seals does not necessarily prevent the probe 12 from making high temperatures measurements. In most applications, only the temperature sensing tip 14 and part of the stem 13 are inserted into an extreme temperature environment while the seal end 32 remains around room temperature.

Molecular sieve is a common name applied to materials such as synthetic zeolite (an Aluminum and Magnesium Silcate) that are very porous, thus having a very large surface area per unit volume. This enables the material to absorb large quantities of gases and vapor. Molecular sieves are available in granular form, and in one preferred embodiment of the invention, granules of molecular sieve 36 are placed inside the housing 26 near the seal end 34.

Generally, absorbtion occurs when the material is cooled. For example, when molecule sieve is cooled from 125 degrees C. to room temperature (approximately 25 degrees C.) it becomes activated to absorb. The range of temperature over which the molecular sieve needs to be cooled to activate absorbtion shall be referred hereinafter as an "activation range of temperatures" (in the above example, the range is 25–125 degrees C.). The activation range of temperature need not be unique; for example, molecular sieve will also absorb large quantity of gases when cooled from room temperature to temperature of liquid nitrogen.

Among all the contaminants that might effect the accuracy of a platinum resistance temperature sensor, water is one of the worst. Organic gases are also bad. It is therefore highly desirable to remove these contaminants as much as possible. It is also desirable to have the temperature sensor operate under a partial vacuum. In the past, it has been customary to pump out the gasses in a resistance thermometer housing, and have the housing sealed while connected to the pump. The absorbtion properties of molecular sieve enables the removal of water and organic gases from the probe and generation of a partial vacuum without having to use a pump at all:

In one preferred embodiment of the invention, a resistance thermometer probe is constructed using the steps of 1) placing a temperature sensor inside a housing;
2) filling some of the space inside the housing with molecular sieve which has an activation range of temperature from 25–125 degrees C.;
3) heating the housing to a high temperature (in the range 400–450 degrees C.) the high temperature being in a range above the activation range of temperature but not exceeding the maximum safe temperature above which some part of the probe may be subjected to damage;
4) allowing the seal end of the housing to cool to an intermediate temperature of about 150 degrees C. while maintaining the rest of the housing, especially that part around the temperature sensor, at the high temperature; the intermediate temperature being below the high temperature while being above the activation range of temperature;
5) applying an adhesive sealant to seal the housing, and providing sufficient time for the adhesive sealant to set thoroughly before
6) allowing the absorbtion means to cool to room temperature (below the activation range of temperatures). As the molecular sieve cools, it becomes activated, and absorbs enough gases inside the housing to generate a partial vacuum of approximately 10 torr.

Figure 3:
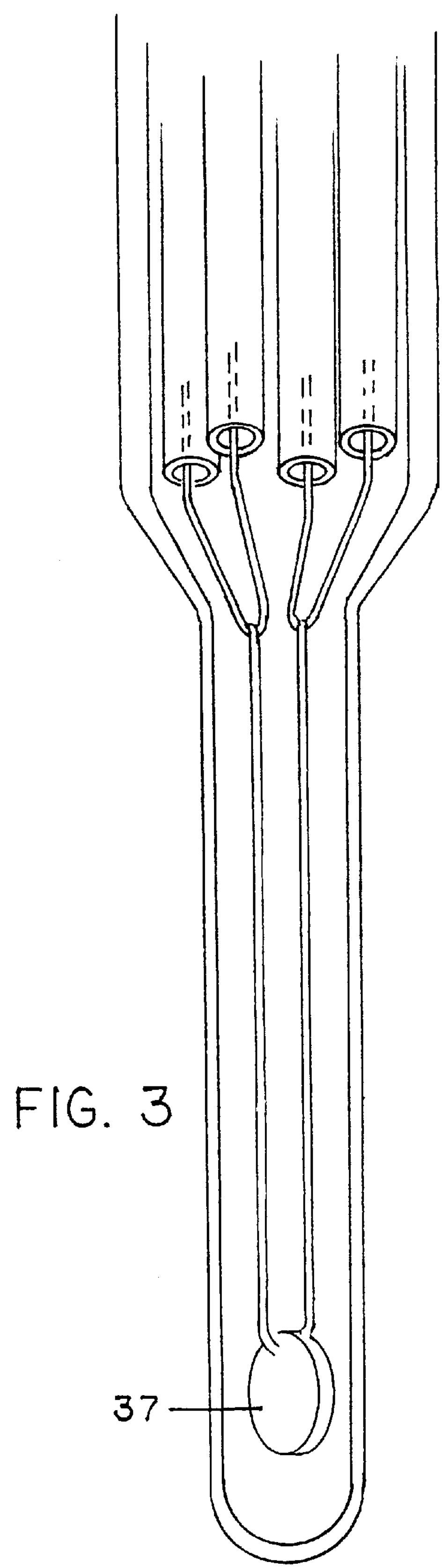
FIG. 3 shows an enlarged sectional view of the temperature sensing end of a probe which is another preferred embodiment of the invention

While a preferred embodiment has been described above in detail for the purpose of illustrating the principles and features of the invention, the description should not be construed to limit the scope of the present invention which is applicable to many variations of resistance thermometer probes. For example: 1) while a thin film platinum resistance temperature sensor has been mentioned in the above example, other resistance temperature sensors, such as thick film platinum, platinum wire, other metallic resistors, and thermistors, could also have been used. FIG. 3 shows part of a resistance thermometer probe in which a thermistor is used as the temperature sensor. 2) while pyrex glass has been used as housing material in the above example; other material, such as quartz, ceramics, stainless steel, inconel, or even other types of glasses could also have been used. 3) while an epoxy resin has been chosen as the adhesive for the seal 33, other adhesive such as other resins, hot-melt glue, vacuum waxes or greases such as Apiezon could also have been used. The seal 35 could also have been made with a glass having coefficient of expansion matching that of the feedthrough wires. 4) While Molecular sieve has been used as the absorbtion means, there are other absorbtion means, such as activated charcoal or natural zeolite, that could be used in some applications In the above description of the resistance thermometer probe, it is understood that the probe is meant to be used with an ohmmeter. The term "ohmmeter" is used to denote any instrument by which electrical resistance is measured. This can include "ordinary ohmmeters", wheatstone bridges, and special instruments in which the electrical resistance is measured, but the output is displayed in temperature units.

I claim:

1. A resistance thermometer probe comprising a temperature sensor;

a housing around said temperature sensor; said housing having 1) a temperature sensing tip for placement of said temperature sensor and 2) a stem to enable said temperature sensing tip to be maintained at a predetermined position for making temperature measurements; said stem being generally cylindrical in shape and said temperature sensing tip being an extension of the stem but is reduced in both diameter and wall thickness to minimize thermal capacity and to maximize heat conduction;

electrically conductive wire-leads for connecting said temperature sensor to an ohmmeter;

granular particles in said housing to provide mechanical support to said temperature sensor and to reduce heat loss by convection;

absorption means inside said housing to capture gases, moisture and volatile organic materials; and sealing means for sealing said housing thereby assuring that said temperature sensor is protected from contimination.

2. A resistance thermometer probe comprising:

a temperature sensor;

a housing around said temperature sensor;

sealing means for sealing said housing to protect said temperature sensor against contamination;

absorption means inside said sealed housing to capture gases, moisture and volatile organic materials thereby providing additional protection for said temperature sensor.

3. A resistance thermometer probe according to claim 2 wherein said absorption means is molecular sieve.

4. A resistance thermometer probe according to claim 2 wherein said temperature sensor comprises a platinum thin film resistor on a ceramic substrate.

5. A resistance thermometer probe according to claim 2 wherein said sealing means comprises an epoxy resin.

6. A method for constructing a resistance thermometer probe comprising the steps of:

1) placing a resistance temperature sensor inside a housing;

2) filling some of the space inside said housing with absorption means; said absorption means having an activation range of temperatures such that said absorption means becomes activated to absorb when it is cooled from a temperature above said activation range to a temperature below said activation range;

3) heating said housing to a high temperature, said high temperature being in a range above said activation range of temperatures but not exceeding the maximum safe temperature above which some part of the probe may be subjected to damaged;

4) applying an adhesive sealant to seal said housing, and providing sufficient time for the adhesive sealant to set thoroughly before;

5) allowing said absorption means to cool to a temperature below said activation range of temperatures thereby activating the absorption means to absorb gases inside the housing, thus generating a partial vacuum.

7. A method according to claim 6 further comprising a step of allowing that part of the housing around the absorption means to cool to a temperature in the range of 125–200 degrees C. while maintaining that part near the temperature sensor at said high temperature.

8. A method according to claim 6 wherein said activation range of temperature is from room temperature to 125 degrees C., and said high temperature lies in a range from 400 to 450 degrees C.

9. A method according to claim 6 wherein said absorption means is molecular sieve.

10. A method according to claim 6 wherein said housing comprises borosilicate glass.

11. A method according to claim 6 wherein said adhesive seal comprises an epoxy resin.

* * * * *